United States Patent [19]

Yamabe et al.

[11] 4,368,308

[45] Jan. 11, 1983

[54] FLUORINE-CONTAINING ELASTOMER HAVING EXCELLENT LOW TEMPERATURE RESISTANCE AND OIL RESISTANCE

[75] Inventors: Masaaki Yamabe, Machida; Shun-ichi Kodama, Yokohama; Gen Kojima, Machida, all of Japan

[73] Assignee: Asahi Glass Company, Ltd., Tokyo, Japan

[21] Appl. No.: 279,543

[22] Filed: Jul. 1, 1981

[30] Foreign Application Priority Data

Jul. 8, 1980 [JP] Japan .................................. 55-92272

[51] Int. Cl.³ ........................................... C08F 216/24
[52] U.S. Cl. .................................................. 526/247
[58] Field of Search ......................................... 526/247

[56] References Cited

U.S. PATENT DOCUMENTS

| | | | |
|---|---|---|---|
| 3,136,745 | 6/1964 | Albin et al. | 526/247 |
| 3,180,895 | 4/1965 | Harris et al. | 526/247 |
| 3,235,537 | 2/1966 | Albin et al. | 526/247 |
| 3,752,789 | 8/1973 | Khan | 526/247 |
| 4,170,686 | 10/1979 | Miller et al. | 526/247 |
| 4,262,101 | 4/1981 | Hartwimmer et al. | 526/247 |

*Primary Examiner*—Harry Wong, Jr.
*Attorney, Agent, or Firm*—Oblon, Fisher, Spivak, McClelland & Maier

[57] ABSTRACT

A fluorine-containing elastomer having excellent low temperature resistance and oil resistance comprises ethylene units (E) and fluorovinyl ether units (FV) having the formula $CF_2=CFOX$ (X represents a $C_1$–$C_9$ perfluoroalkyl group which can have one or more ether bond) at a molar ratio of (E) to (FV) of 95:5 to 30:70 and at a total content of (E) and (FV) of at least 70 mole %.

2 Claims, 1 Drawing Figure

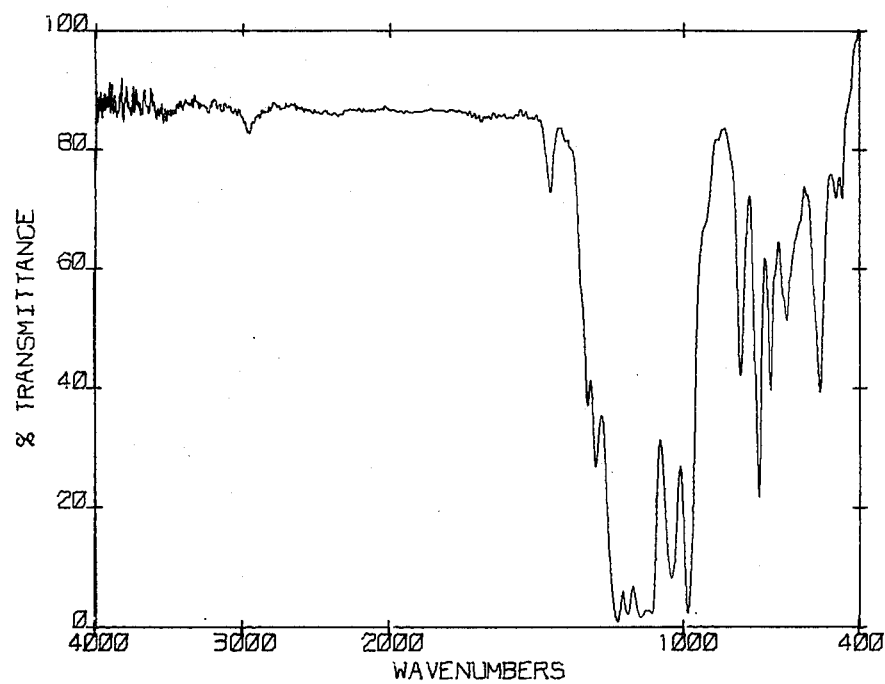

FLUORINE-CONTAINING ELASTOMER HAVING EXCELLENT LOW TEMPERATURE RESISTANCE AND OIL RESISTANCE

BACKGROUND OF THE INVENTION

1. Field of the Invention

The present invention relates to a novel fluorine-containing copolymer. More particularly, it relates to a copolymer for an elastomer having excellent low temperature resistance and oil resistance which comprises specific contents of ethylene units and specific fluorovinyl ether units.

2. Description of the Prior Arts

It has been known to provide fluorine-containing elastomers from copolymers made of vinylidene fluoride/hexafluoropropylene; tetrafluoroethylene/propylene; tetrafluoroethylene/perfluoroalkyl vinyl ether; or vinylidene fluoride/perfluoroalkyl vinyl ether. These elastomers have been used as useful elastomers. Such elastomers have excellent characteristics which could not be imparted by hydrocarbon type elastomers in view of heat resistance, oil resistance and chemical resistance, however they have not satisfactory low temperature performance.

On the other hand, it has been known that fluorine-containing elastomers having siloxane bonds or phosphazene bonds in a main chain and fluorinated alkyl groups or fluorinated alkoxy groups as branched chains have excellent low temperature resistance. Such elastomers have, however, inferior chemical resistance and heat resistance to those of the above-mentioned fluorocarbon type fluorine-containing elastomers.

The fluorocarbon type elastomers having excellent low temperature resistance together with excellent heat resistance and chemical resistance have not been found through such elastomers have been desired in the fields of automobiles and airplanes.

SUMMARY OF THE INVENTION

It is an object of the present invention to provide copolymers of ethylene and perfluorovinyl ether for elastomers having excellent heat resistance, oil resistance, low temperature resistance and chemical resistance.

The foregoing and other objects of the present invention have been attained by providing a novel copolymer for a fluorine-containing elastomer having excellent low temperature resistance and oil resistance which comprises ethylene units (E) and fluorovinyl ether units (FV) having the formula $CF_2=CFOX$ (X represents a $C_1$-$C_9$ perfluoroalkyl group which can have one or more ether bond) at molar ratio of (E) to (FV) of 95:5 to 30:70 and at a total content of (E) and (FV) of at least 70 mole %.

DETAILED DESCRIPTION OF THE PREFERRED EMBODIMENTS

In the present invention, it is important to use the fluorovinyl ether having the formula $CF_2=CFOX$ wherein X represents a perfluoroalkyl group which can have one or more ether bond.

It is not desired to use a fluorovinyl ether having the formula $CF_2=CFOX$ wherein X is a hydrogen-containing group, for example, an alkyl group such as methyl, ethyl and n-butyl group, an alkoxyalkyl group such as 2-methoxyethyl group, or 2,2,2-trifluoroethyl group, because of inferior heat resistance of the product.

When X is a group having no ether bond, it is preferably a $C_1$-$C_6$ perfluoroalkyl group preferably a $C_1$-$C_3$ perfluoroalkyl group especially trifluoromethyl group because the resulting copolymer has inferior low temperature resistance and the polymerization activity is lower to be difficult to obtain the copolymer having a high molecular weight in the case of a higher perfluoroalkyl group.

On the other hand, when X is a group having one or more ether bond, one or more ether bond is given in each branched chain of the resulting copolymer. The relation of carbon atom numbers and low temperature resistance is not simple. In view of the polymerization activity and commercial availability, it is not preferable to be a higher perfluoroalkyl group and it is preferable to have a $C_2$-$C_9$ preferably $C_2$-$C_6$ perfluoroalkyl group having one or more ether bond.

Suitable perfluorovinyl ethers include perfluoro(2-n-propoxypropyl vinyl ether)

(referring to as PHVE); perfluoro(3-methoxypropyl vinyl ether) $(CF_2=CFO(CF_2)_3OCF_3)$; perfluoro(2-methoxypropyl vinyl ether) $(CF_2=CFOCF_2CF(CF_3)OCF_3)$; perfluoro(2-methoxyethyl vinyl ether) $(CF_2=CFO(CF_2)_2OCF_3)$, and perfluoro(3,6,9-trioxa-5,8-dimethyl dodeca-1-ene)$(CF_2=CFOCF_2CF(CF_3)OCF_2CF(CF_3)OCF_2CF_2CF_3)$. It is especially preferable to use PHVE in view of commercial availability and effect for a low temperature resistance. One or more of the fluorovinyl ethers can be used in the copolymerization.

In the copolymerization of the present invention, it is possible to provide the other comonomer units at a content of up to 30 mole % beside the ethylene units and the fluorovinyl ether units.

Such other comonomers can be fluoroolefins, such as tetrafluoroethylene, vinylidene fluoride, chlorotrifluoroethylene, vinyl fluoride and hexafluoropropylene; olefins such as propylene, isobutylene and butene-1; and vinyl ethers such as ethyl vinyl ether. It is also possible to use a comonomer having reactive site such as 2-chloroethyl vinyl ether, perfluoro(2-bromoethyl vinyl ether), and vinyl monochloroacetate.

In the copolymer of the present invention, it is important to give a molar ratio of ethylene units to fluorovinyl ether units of 95:5 to 30:70, preferably 90:10 to 40:60. When the molar ratio of ethylene units is more than the upper limit, the characteristics of heat resistance and oil resistance are inferior, whereas when it is less than the lower limit, the efficiency of the copolymerization is inferior to cause lower molecular weight and inferior mechanical characteristics as the elastomer. These are disadvantageous.

The copolymer of the present invention can be produced by applying a radical initiation source to a monomer mixture of ethylene and the fluorovinyl ether, if necessary the other comonomer. Such copolymerization may be carried out at a high temperature under high pressure, however it is preferably carried out at a low temperature to obtain a copolymer having high molecular weight. The radical initiation source can be various peroxides or azo type polymerization initiators suitable for low temperature polymerization as well as an ionized radiation.

The initiators suitable for low temperature polymerizations include organic peroxides such as diisopropylperoxydicarbonate, diethylhexylperoxydicarbonate, acetylcyclohexylsulfonylperoxide, t-butylperoxypivalate, 2,4-dichloro-benzoylperoxide, isobutylperoxide and octanoylperoxide; and azo compounds such as 2,2-azobis(4-methoxy 2,4-dimethylvaleronitride) and a combination thereof with a desired reducing agent. It is especially preferable to use a redox initiator as a combination of an inorganic peroxide such as a persulfate and a desired reducing agent for example, a highly active redox initiator comprising a persulfate, an iron ion source, ethylenediamine-tetraacetic acid or a salt thereof and a sulfinate.

An amount of the polymerization initiator is decided depending upon a kind of the initiator and a condition for copolymerization and it is usually in a range of 0.005 to 5 weight part especially about 0.01 to 0.5 weight part per 100 weight parts of the total monomers.

The copolymer of the present invention can be produced by a batch, semi-batch or continuous polymerization process. The type of the polymerization can be a bulk polymerization, a solution polymerization or an emulsion polymerization. In view of effective production of a copolymer having high molecular weight, it is preferable to employ an emulsion polymerization.

A temperature in the polymerization is preferably in a range of 60° to −30° C. especially 40° to 0° C. When the polymerization temperature is too high, it is difficult to obtain a copolymer having high molecular weight whereas when it is too low, it causes troubles such as solidification of a medium for polymerization. A pressure in the polymerization can be the pressures in the conventional polymerizations and it can be lower than 150 kg/cm$^2$ especially lower than 100 kg/cm$^2$.

The medium for copolymerization can be selected depending upon the type of the polymerization and it is preferably selected so as to possibly prevent a chain transfer.

The media for polymerization suitable for a solvent polymerization are media having a low chain transfer constant such as t-butanol, methyl acetate and chlorofluorocarbon. However, in view of an effective production of a copolymer having high molecular weight, it is advantageous to employ an emulsion polymerization using an aqueous medium. In view of an acceleration of a polymerization and a stabilization of a latex, it is preferably to employ a mixed medium comprising water and an organic solvent. Suitable organic solvents include t-butanol, methyl acetate and trichlorotrifluoroethane. When an aqueous medium is used, it is possible to add a pH modifier and a buffering agent so as to control pH of the medium depending upon an activity of a polymerization initiator.

The copolymer of the present invention can be identified by an IR spectrum as characteristic absorptions near 990 cm$^{-1}$ for >CF—O— bond; near 2900 cm$^{-1}$ for —CH$_2$—; and in 1000-1400 cm$^{-1}$ for —CF$_2$— and —CF$_3$ bonds. As a typical example, IR spectrum of a copolymer of E and PHVE at a molar ratio of E to PHVE of 53.3:46.7 is shown in the drawing.

The copolymer of the present invention is crosslinkable by an ionized radiation or an addition of a curative such as peroxy compounds. It is effective to improve a crosslinkability by a copolymerization with a third comonomer for a reactive site and it is preferable to add a cure promoter such as polyallyl compound.

In the crosslinking process for the copolymer of the present invention, it is possible to incorporate various additives used in the conventional crosslinking process. Suitable additives include metal oxides such as magnesium oxide and lead oxide; reinforcing fillers such as carbon black, fine silica, clay and talc; other fillers; pigments; antioxidants and stabilizers.

When various additives are incorporated into the copolymer of the present invention, it is preferable to uniformly blend them. Such blending is attained by the conventional devices such as a rubber open mill and Banbury mixer. The operation for the blending is not critical. In usual, the additives can be dispersed well into the fluorine-containing copolymer by kneading the mixture at about 30° to 80° C. for about 10 to 60 minutes.

It is also possible to add the additives in a form of a suspension by dissolving and dispersing the additive in a suitable medium. It is also possible to employ a wet blending for blending them in a medium. In the latter process, a suspension can be prepared by using a mixing device such as an open roll, a ball mill and a homogenizer. It is preferable to select the optimum condition and operation in the blending process depending upon kinds of the raw materials and the additives.

The mixture can be fabricated into a form of a sheet, a pipe, a rod, a tube, an angle, a channel, a coated fabric and a coated board by continuous fabrication processes such as an extrusion, a transfer molding process, a roll-coating process, a brush-coating process and a dipping process beside a compression molding process. It is also possible to fabricate it into articles with complexed shape and special molded products such as sponge rubber by various molding and processing processes. The fabricated mixture is vulcanized by a desired vulcanizing means whereby a vulcanized elastomer is obtained from the fluorine-containing copolymer of the present invention.

An elastomer having excellent heat resistance, chemical resistance and oil resistance and low temperature resistance can be obtained from the fluorine-containing copolymer of the present invention. The elastomers can be used for various usages and objects in various fields because of such characteristics, for example, heat resistant-anticorrosive gasket, packing and O-ring; oil resistant sealing material, oil hose, tube and diaphragm; heat resistant-anticorrosive roll; steam resistant gasket; gasket for heat exchanger; and heat resistant-oil resistant electric wire.

The present invention will be further illustrated by certain examples and references which are provided for purposes of illustration only and are not intended to be limiting the present invention.

EXAMPLE 1

In a 100 ml. stainless steel ampoule, 37.9 g. of deionized water, 5 g. of t-butanol, 0.5 g. of ammonium persulfate, 1.0 g. of disodium hydrogen-phosphate dodecylhydrate; 0.25 g. of ammonium perfluorononanoate and 2.2 g. of 5% NaOH aqueous solution were charged and solidified by freezing with liquid nitrogen. A solution obtained by dissolving 0.0075 g. of ferrous sulfate heptahydrate, 0.009 g. of EDTA, 2Na dihydrate and 0.004 g. of sodium hydroxymethanesulfinate in 5 g. of water was charged and further 9.43 g. of perfluoro(2-n-propoxypropyl vinyl ether) (PHVE) was charged and the ampoule was purged and 0.56 g. of ethylene (E) was fed. A molar ratio of the charged monomers E/PHVE was 47.8:52.2.

The ampoule was dipped in a constant temperature water bath at 25° C. and was shaken at a rate of 110 cycle/min. After 2-3 minutes, the polymerization pressure reached to 2.9 kg/cm$^2$ (gauge) and then decreased to 1.7 kg/cm$^2$ after 1.5 hours. The unreacted monomer was purged and the ampoule was opened. A uniform latex was obtained. The copolymer was agglomerated from the latex by a freezing agglomeration and washed with water and dried to obtain 1.51 g. of a solvent insoluble soft rubber-like copolymer.

IR spectrum of the resulting copolymer is shown in the attached drawing. According to an elemental analysis, the copolymer had a formulation of E and PHVE at a molar ratio of E to PHVE of 53.3:46.7. The copolymer had a thermal decomposition temperature (a temperature for initiating a weight loss under heating at a rate of 10° C./min in air; referring to as Td) of 354° C.; a glass transition temperature (a temperature measured by DSC at a rate of 10° C./min.; referring to as Tg) of −41° C. and a weight increase percent after dipping into JIS B fuel oil at room temperature for 3 days; referring to as $S_B$) of 5.6%.

EXAMPLES 2 AND 3

In accordance with the process of Example 1 except varying the formulation of the charged monomers, each copolymerization was carried out. The results are shown in Table 1.

TABLE 1

|  | Example 2 | Example 3 |
|---|---|---|
| Monomers |  |  |
| charged (E) (g) | 2.06 | 0.89 |
| (PHVE) (g) | 7.94 | 9.11 |
| formulation |  |  |
| molar ratio of (E)/(PHVE) | 80.0/20.0 | 60.0/40.0 |
| Polymerization time (hr.) | 1.0 | 1.5 |
| Polymerization pressure (kg/cm$^2$ gauge) | 18.6→13.3 | 6.3→4.0 |
| Copolymer |  |  |
| yield (g) | 1.6 | 1.8 |
| formulation |  |  |
| molar ratio of (E)/(PHVE) | 67.3/32.7 | 56.2/43.8 |
| Td (°C.) | 320 | 338 |
| Tg (°C.) | −45 | −40 |

EXAMPLE 4

In accordance with the process of Example 1 except using perfluoro(propyl vinyl ether) (PPVE) together with E and PHVE at ratios of E:PHVE:PPVE of 0.74 g.:5.73 g.:3.53 g. as molar ratios of 49.8:25.1:25.1, a copolymerization was carried out. The initial pressure was 7.2 kg/cm$^2$. After 1 hour, the pressure decreased to 5.0 kg/cm$^2$. The polymerization was stopped and 1.89 g. of a copolymer was obtained. The copolymer had a formulation of molar ratios of E:PHVE:PPVE of 52.0:20.6:27.4 and had Td of 356° C.; Tg of −27° C. and $S_B$ of 7.5%.

EXAMPLE 5

In accordance with the process of Example 1 except using perfluoromethyl vinyl ether (PMVE) instead of PHVE as the charged monomer at a ratio of E to PMVE of 0.56 g.:3.23 g. as a molar ratio of 50.0:50.0, a copolymerization was carried out.

The initial pressure was 9.5 kg/cm$^2$. After 30 minutes, the pressure decreased to 5.3 kg/cm$^2$ and the polymerization was stopped to obtain 2.50 g. of a copolymer. The copolymer had a formulation of a molar ratio of E to PMVE of 51.5:48.5 and had Td of 388° C.; Tg of −46° C. and $S_B$ of 9.3%.

EXAMPLE 6

In accordance with the process of Example 1 except using vinylidene fluoride (VdF) together with E and PHVE as the charged monomers at ratios of E:PHVE:VdF of 0.54 g.:8.37 g.:0.28 g. as molar ratios of 44.7:45.1:10.2, a copolymerization was carried out.

The initial pressure was 8.1 kg/cm$^2$. After 1.5 hours, the pressure decreased to 6.9 kg/cm$^2$ and the polymerization was stopped to obtain 1.76 g. of a copolymer. The copolymer had a formulation of molar ratios of E:PHVE:VdF of 48.5:45.3:6.2 and had Td of 300° C.; and Tg of −34° C.

EXAMPLE 7

In a 1 liter stainless steel autoclave equipped with a stirrer, 379 g. of deionized water, 50 g. of t-butanol, 2.5 g. of ammonium perfluorononanoate; and 21.5 g. of 5% NaOH aqueous solution were charged. A solution prepared by dissolving 0.075 g. of ferrous sulfate heptahydrate and 0.09 g. of EDTA.2Na dihydrate in 50 g. of water was charged and 101 g. of PHVE was charged. The autoclave was purged with nitrogen gas and degased and 13.5 g. of ethylene was fed.

A temperature of the autoclave was controlled at 20° C. and an aqueous solution of 5.0 wt.% of CH$_2$(OH)-SO$_2$Na.2H$_2$O and 1.7 wt.% of NaOH was fed at a rate of 1 g/minute by a constant quantity pump. During the feeding, the temperature of the autoclave raised to 25° C. and was kept at 25° C. The pressure in the autoclave reached to 5.5 kg/cm$^2$ (gauge) and then gradually decreased, during the reaction. When the pressure decreased to 5.0 kg/cm$^2$, ethylene was further fed to increase the pressure in the autoclave to 5.5 kg/cm$^2$. The operation was repeated to maintain the pressure in the autoclave in the range of 5.5 kg/cm$^2$ to 5.0 kg/cm$^2$. The reaction velocity decreased depending upon the reaction time. Therefore, the aqueous solution of CH$_2$(OH)-SO$_2$Na and NaOH was added at each rate of 9.0 g. each one hour to maintain the polymerization activity. After 4.5 hours, the unreacted monomer was purged to stop the copolymerization. A uniform latex formed in the autoclave treated by a freezing agglomeration to separate a copolymer and the copolymer was washed with water and dried to obtain 37.5 g. of the copolymer. The copolymer was a soft elastomer having a molar ratio of E to PHVE of 53:47 and Td of 338° C. and Tg of −42° C.

The resulting copolymer was admixed with 3 phr of triallyl cyanurate (TAIC) and 35 phr of MT carbon by an open roll mill and the mixture was treated by a press molding machine to form a sheet having a size of 1 mm×10 cm×6 cm. The sheet was crosslinked by a radiation of γ-ray from a cobalt 60 source at a dose of 1×10$^5$ r/hour for 20 hours. The resulting crosslinked sheet was an elastic sheet having a tensile strength of 60 kg/cm$^2$; a breaking elongation of 195%; and an elastic recovery of JIS A hardness of 68 and a volumetric swelling percent of 5.4% at room temperature in a fuel oil B. and a Clash-Berg test 10$^4$ psi point of −34° C. The crosslinked sheet was heated at 200° C. for 10 days, whereby 105% of the tensile strength and 110% of the elongation were maintained and a hardness change was zero.

EXAMPLE 8

In accordance with the process of Example 7 except changing the charged E and PHVE at a molar ratio of E to PHVE of 80:20 at the initiation; and incorporating 2.5 mole % of 2-chloroethyl vinyl ether, a copolymerization was carried out.

The polymerization behavior similar to that of Example 7 was observed. After the reaction for 5 hours, 30.5 g. of a copolymer was obtained.

It was confirmed by a chlorine content that the copolymer comprised 3.0 mole % of 2-chloroethyl vinyl ether units.

To 20 g. of the resulting copolymer, 7 g. of MT carbon, 1 g. of magnesia having low activity, 0.4 g. of α,α'-bis(t-butylperoxy) p-diisopropyl benzene (Nippon Oil and Fat K.K.) and 1 g. of TAIC were added and the mixture was vulcanized at 180° C. for 30 minutes by a press-vulcanization and then, at 200° C. for 4 hours by an oven vulcanization to fabricate a sheet similar to Example 7. A microdumbbell specimen cut from the vulcanized sheet had a tensile strength of 55 kg/cm$^2$ and a breaking elongation of 155% and a JIS A hardness of 70 and a volumetric swelling percent of 4.5% at room temperature in fuel oil B. and a Clash-Berg test 10$^4$ psi point of $-38°$ C.

EXAMPLE 9

In accrdance with the process of Example 1 except using methyl acetate instead of t-butanol, a copolymerization was carried out. After the polymerization for 1.0 hour, 2.0 g. of a copolymer was obtained in a form of a latex. The resulting copolymer was a soft rubber-like copolymer having a molar ratio of E to PHVE of 54.2:45.8.

We claim:

1. A fluorine-containing elastomer having excellent low temperature resistance and oil resistance which comprises ethylene units (E) and fluorovinyl ether units (FV) having the formula $CF_2=CFOX$ (X represents a $C_1$-$C_9$ perfluoro-alkoxyalkyl group which can have one or more ether bond) at a molar ratio of (E) to (FV) of 95:5 to 30:70 and at a total content of (E) and (FV) of at least 70 mole %.

2. The elastomer according to claim 1 wherein said fluorovinyl ether is perfluoro(2-n-propoxypropyl vinyl ether).

* * * * *